(12) United States Patent
Rank et al.

(10) Patent No.: US 10,586,431 B2
(45) Date of Patent: Mar. 10, 2020

(54) HAPTIC SYSTEM WITH INCREASED LRA BANDWIDTH

(71) Applicant: IMMERSION CORPORATION, San Jose, CA (US)

(72) Inventors: Stephen D. Rank, San Jose, CA (US); Erin B. Ramsay, Dollard-des-Ormeaux (CA); Henry Da Costa, Montreal (CA); Arnab Sen, San Jose, CA (US); Elena Renee Redelsheimer, Emeryville, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 16/010,916

(22) Filed: Jun. 18, 2018

(65) Prior Publication Data

US 2019/0066459 A1 Feb. 28, 2019

Related U.S. Application Data

(63) Continuation of application No. 15/364,951, filed on Nov. 30, 2016, now Pat. No. 10,026,276, which is a
(Continued)

(51) Int. Cl.
  *G08B 6/00* (2006.01)
  *G06F 3/0488* (2013.01)
  *G06F 3/01* (2006.01)

(52) U.S. Cl.
  CPC .............. *G08B 6/00* (2013.01); *G06F 3/016* (2013.01); *G06F 3/0488* (2013.01)

(58) Field of Classification Search
  CPC .......... G08B 6/00; G06F 3/016; G06F 3/0488
  See application file for complete search history.

(56) References Cited

U.S. PATENT DOCUMENTS

| 5,576,727 A | 11/1996 | Rosenberg et al. |
| 6,281,651 B1 | 8/2001 | Haanpaa et al. |
| (Continued) | | |

FOREIGN PATENT DOCUMENTS

| CN | 102713793 A | 10/2012 |
| JP | 2002149312 A | 5/2002 |
| (Continued) | | |

OTHER PUBLICATIONS

Notice of Reasons for Rejection issued in Japanese Application No. 2013-257676, dated Oct. 23, 2018.
(Continued)

*Primary Examiner* — Hongmin Fan
(74) *Attorney, Agent, or Firm* — Medler Ferro Woodhouse & Mills PLLC

(57) ABSTRACT

A method of generating a haptic effect on a linear resonance actuator ("LRA") having a resonant frequency includes receiving a haptic effect signal for the haptic effect, where the haptic effect comprises a desired frequency that is off-resonant from the LRA. The method further includes generating a first sine wave at the desired frequency and generating a second sine wave at or near the resonant frequency. The method further includes combining the first sine wave and the second sine wave to generate a drive signal.

18 Claims, 8 Drawing Sheets

Related U.S. Application Data continuation of application No. 14/105,481, filed on Dec. 13, 2013, now Pat. No. 9,524,624.

(60) Provisional application No. 61/790,190, filed on Mar. 15, 2013, provisional application No. 61/736,912, filed on Dec. 13, 2012.

(56) References Cited

U.S. PATENT DOCUMENTS

| | | |
|---|---|---|
| 6,396,232 B2 | 5/2002 | Haanpaa et al. |
| 6,987,504 B2 | 1/2006 | Rosenberg et al. |
| 7,265,750 B2 | 9/2007 | Rosenberg |
| 7,511,706 B2 | 3/2009 | Schena |
| 2002/0030663 A1 | 3/2002 | Tierling et al. |
| 2002/0097223 A1 | 7/2002 | Rosenberg |
| 2005/0134561 A1 | 6/2005 | Tierling et al. |
| 2005/0134562 A1 | 6/2005 | Grant et al. |
| 2008/0198139 A1 | 8/2008 | Lacroix et al. |
| 2009/0243997 A1* | 10/2009 | Tierling ............... G01H 13/00 345/156 |
| 2010/0148944 A1 | 6/2010 | Kim et al. |
| 2010/0153845 A1 | 7/2010 | Gregorio et al. |
| 2011/0115709 A1 | 5/2011 | Cruz-Hernandez |
| 2012/0232780 A1 | 9/2012 | Delson et al. |
| 2012/0249462 A1 | 10/2012 | Flanagan et al. |
| 2014/0139327 A1 | 5/2014 | Bau et al. |
| 2014/0015777 A1 | 6/2014 | Park et al. |

FOREIGN PATENT DOCUMENTS

| | | |
|---|---|---|
| JP | 2003-288158 A | 10/2003 |
| JP | 2008-521597 A | 6/2008 |
| JP | 2008-546534 A | 12/2008 |
| JP | 2010-519649 A | 6/2010 |
| JP | 2011-501296 A | 1/2011 |
| JP | 2011-248884 A | 12/2011 |
| WO | 2006/071449 A1 | 7/2006 |
| WO | 2008/103535 A1 | 8/2008 |

OTHER PUBLICATIONS

Extended European Search Report for Application No. 18206808.0, dated Feb. 26, 2019.
Notice of Reasons for Rejection issued in Japanese Application No. 2018-155413, dated Aug. 6, 2019.
Notification of the First Office Action issued in Chinese Application No. 201710802686.X, dated Nov. 20, 2019.
Notice of Preliminary Rejection issued in Korean Application No. 10-2013-0155583, dated Oct. 22, 2019.

* cited by examiner units drive voltage by microseconds (1 unit=125 microseconds)

units drive voltage by microseconds (1 unit=125 microseconds)

units drive voltage by microseconds (1 unit=125 microseconds)

units drive voltage by microseconds (1 unit=125 microseconds)

HAPTIC SYSTEM WITH INCREASED LRA BANDWIDTH

CROSS REFERENCE TO RELATED APPLICATIONS

This application is a continuation of U.S. patent application Ser. No. 15/364,951 filed on Nov. 30, 2016, which is a continuation of U.S. application Ser. No. 14/105,481, filed on Dec. 13, 2013 and issued as U.S. Pat. No. 9,524,624 on Dec. 20, 2016, which claims priority of U.S. Provisional Patent Application Ser. No. 61/736,912, filed Dec. 13, 2012 and U.S. Provisional Patent Application Ser. No. 61/790,190, filed Mar. 15, 2013, the contents of each of which is hereby incorporated by reference.

FIELD

One embodiment is directed generally to a system that generates haptic effects, and in particular to a system that generates haptic effects using a linear resonance actuator.

BACKGROUND INFORMATION

Portable/mobile electronic devices, such as mobile phones, smartphones, camera phones, cameras, personal digital assistants ("PDA"s), etc., typically include output mechanisms to alert the user of certain events that occur with respect to the devices. For example, a cell phone normally includes a speaker for audibly notifying the user of an incoming telephone call event. The audible signal may include specific ringtones, musical ditties, sound effects, etc. In addition, cell phones may include display screens that can be used to visually notify the users of incoming phone calls.

In some mobile devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment. In order to generate vibration effects, many devices utilize some type of actuator/motor or haptic output device. Known actuators used for this purpose include a linear resonance actuator.

SUMMARY

One embodiment is a method of generating a haptic effect on a linear resonance actuator ("LRA") having a resonant frequency. The method includes receiving a haptic effect signal for the haptic effect, where the haptic effect comprises a desired frequency that is off-resonant from the LRA. The method further includes generating a first sine wave at the desired frequency and generating a second sine wave at or near the resonant frequency. The method further includes combining the first sine wave and the second sine wave to generate a drive signal.

DETAILED DESCRIPTION

One embodiment is a system that generates haptic effects using a linear resonance actuator ("LRA"). Embodiments combine multiple signals in order to drive the LRA at off-resonant frequencies to increase the bandwidth of the LRA.

One type of LRA may use a movable mass, permanent magnet, voice coil and spring to generate vibrations. The voice coil produces a magnetic field which interacts with the permanent magnet, causing it to move, which compresses or stretches the spring to which it is attached. The drive signal needs to alternate the direction of current (i.e., an alternating current ("AC") signal) and generate the magnetic field to make the permanent magnet oscillate back and forth with the spring. The moving mass is attached to the magnet, and the moving of the mass back and forth generates the vibrations. Another type of LRA may include two or more layers of piezo-electric ceramics with a mass attached so that when the piezo bends, the mass moves in a linear/oscillating fashion. Additional types of LRAs that include a vibrating motor that is driven with an oscillating signal can also be used with embodiments disclosed herein.

AC drive signals can have a frequency and an amplitude. The higher the amplitude the greater the vibration output for a given frequency. However, the frequency of the drive signal can be an important factor. An LRA has a resonant frequency which the input signal should operate at, in order to maximize the vibration generated. Vibration performance drops off significantly when the input signal frequency is moved too far from the resonant frequency. Therefore, most haptic devices apply a drive signal at the resonant frequency of the LRA when generating haptic effects. Most LRAs used to generate haptic effects have a resonant frequency within the 150-200 Hz range.

Figure 1:
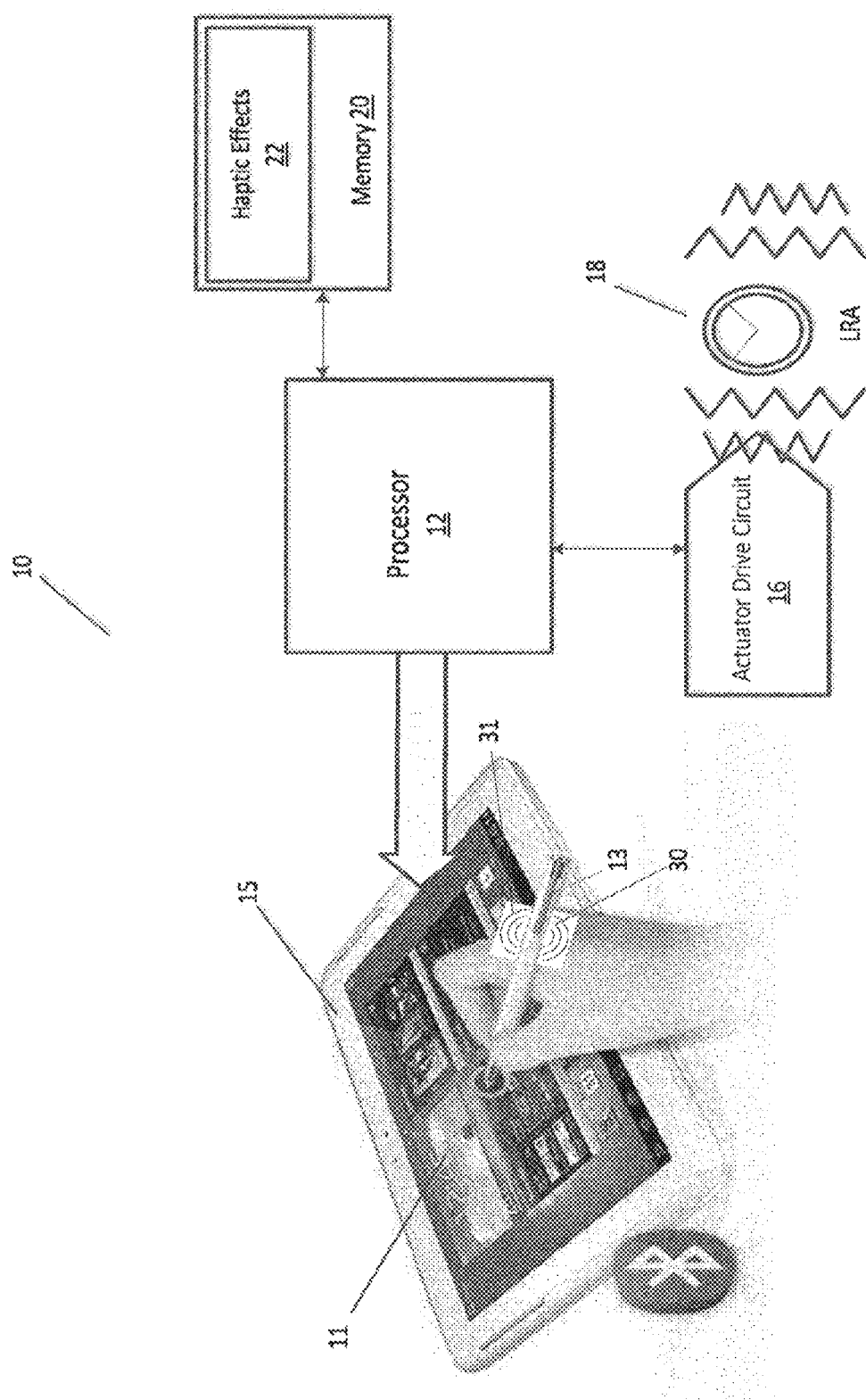
FIG. 1 is a block diagram of a haptically-enabled system in accordance with one embodiment of the present invention.

In contrast with known haptic systems that use LRAs, the type of haptic effects generated by embodiments of the present invention require an increased range/bandwidth of an LRA, outside of its resonant frequency, to be effective. Specifically, FIG. 1 is a block diagram of a haptically-enabled system 10 in accordance with one embodiment of the present invention. System 10 includes a touch sensitive surface 11 or other type of user interface mounted within a housing 15. System 10 further includes a pen/stylus 13 that is in communication with the rest of system 10 using a wireless (e.g., Bluetooth) or wired communication link.

Internal to system 10 is a haptic feedback system that generates vibrations 30, 31 on stylus 13, as well as optionally on other areas of system 10, such as on touch surface 11 or housing 15. The haptic feedback system includes a processor or controller 12. Coupled to processor 12 is a memory 20 and an actuator drive circuit 16, which is coupled to an LRA 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based in part on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to actuator drive circuit 16, which includes electronic components and circuitry used to supply LRA 18 with the required electrical current and voltage (i.e., "motor signals") to cause the desired haptic effects. System 10 may include more than one LRA 18, or other type of actuator, and each actuator may include a separate drive circuit 16, all coupled to a common processor 12.

Memory device 20 can be any type of storage device or computer-readable medium, such as random access memory ("RAM") or read-only memory ("ROM"). Memory 20 stores instructions executed by processor 12. Among the instructions, memory 20 includes a haptic effects module 22 which are instructions that, when executed by processor 12, generate drive signals for LRA 18 that increase the output bandwidth of LRA 18, as disclosed in more detail below. Memory 20 may also be located internal to processor 12, or may be any combination of internal and external memory.

Touch surface 11 recognizes touches, and may also recognize the position and magnitude of touches on the surface. The data corresponding to the touches is sent to processor 12, or another processor within system 10, and processor 12 interprets the touches and in response can generate haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such a cellular telephone, personal digital assistant ("PDA"), smartphone, computer tablet/pad, gaming console, etc., or may be any other type of device that includes a haptic effect system that includes one or more LRAs. System 10 may also be a wearable device (e.g., a bracelet, armband, glove, jacket, vest, pair of glasses, shoes, belt, etc.) that includes one or more LRAs that generate haptic effects. The user interface may be a touch sensitive surface, or can be any other type of user interface such as a mouse, touchpad, mini-joystick, scroll wheel, trackball, game pads or game controllers, etc.

In one embodiment, LRA 18 and drive circuit 16 are located within stylus 13, and generate haptic effects directly on stylus 13. In this embodiment, the remaining elements of the haptic effect system are located within housing 15, and are in communication with stylus 13. As discussed above, system 10 requires LRA 18 to have a wider frequency response range than standard LRAs because it has a need to generate a wide variety of haptic effects to be designed off-resonance. For example, one embodiment generates haptic effects on stylus 13 to simulate a texture when used by a user to "draw" on screen 11. Further generated haptic effects by LRA 18 can cause stylus 13 to simulate a pen or pencil using different off-resonance haptic signals (i.e., stylus 13 can feel to a user like a pencil or a pen, depending on which haptic effect is generated by LRA 18). These types of haptic effects may further require the independent variation of the frequency and strength of the vibration.

Known haptic effect systems (e.g., the "Touchsense 3000" from Immersion Corp.) that use an LRA typically use a controller to communicate the haptic drive signal using a pulse-width modulation ("PWM") signal (i.e., a rectangular pulse wave whose pulse width is modulated). These known systems require an AC drive signal whose frequency generally corresponds to the actuator's resonant frequency (typically 175 Hz). In contrast, one embodiment allows for the independent control of frequency and strength on the LRA to increase the bandwidth of the LRA.

Figure 2:
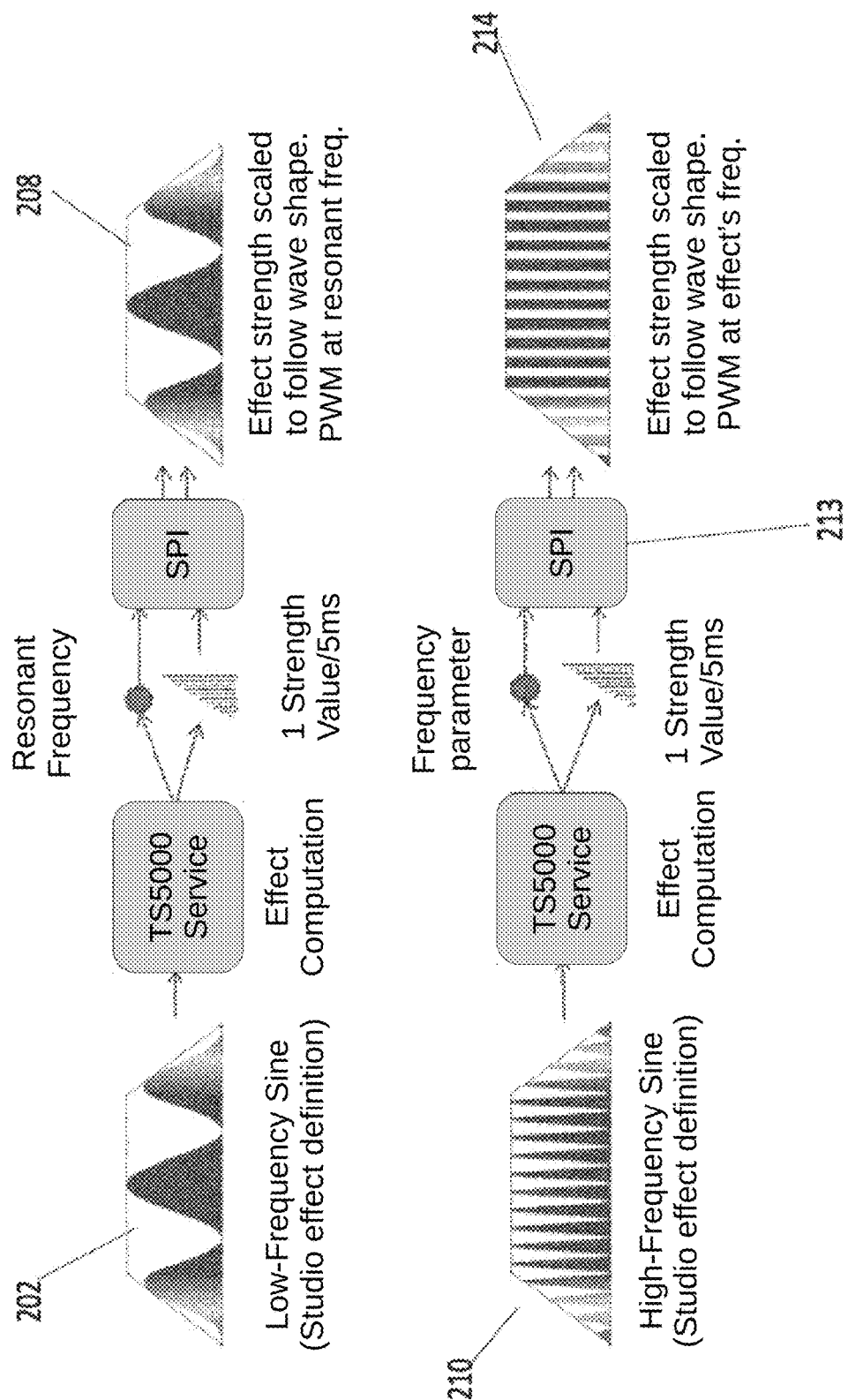
FIG. 2 illustrates the handling of the frequency parameter of a haptic effect in accordance with one embodiment of the present invention.

FIG. 2 illustrates the handling of the frequency parameter of a haptic effect in accordance with one embodiment of the present invention. In the example of FIG. 2, the haptic effect is ultimately rendered or played by a "TS5000 Player" from Immersion Corp. and will be interpreted in different ways based on its frequency characteristics.

Specifically, for low frequencies (e.g., less than 20 Hz) such as input effect 202, the frequency and wave shape will be interpreted as an envelope. For example, if the effect is a sine wave, the strength of the effect will rise and fall following the shape of the sine wave. The output effect 208 will be at the resonant frequency of the LRA and will be modulated by the input effect 202. Depending on actuator capabilities, this pulsing effect can only be done if the designed frequency is around 20 Hz or lower in one embodiment. The exact frequency for this pulsing range depends on the LRA's resonant frequency and the rise time (or the time it takes the actuator to reach nominal acceleration).

For high frequencies (e.g., greater than 150 Hz) such as input effect 210, the frequency parameter will be passed through to a Service Provider Interface ("SPI") 213 or other interface unit. SPI 213 in one embodiment is responsible for sending the frequency and strength values to stylus 13 (over Bluetooth or other medium), and scales the effect strength to match the envelope. This technique is effective for a range of frequencies near the resonance frequency of the LRA (e.g., approximately 150-250 Hz).

In contrast to the "low" and "high" frequency haptic effects described above, for "mid-range" frequency haptic effects (e.g., 20-150 Hz), embodiments transition between the above modes. The frequency range depends upon the actuator used and could be lower than a typical or common medium frequency range for an LRA. For example, the lower end of the middle range could be less than or equal to 2 Hz and a high end of the middle range could be equal to or greater than 200 Hz. Embodiments implement one or more of the below techniques for transitioning between the high and low frequency in order to generated increased LRA bandwidth haptic effects.

Transition Point

In one embodiment, a single point in the critical range (i.e., "mid-range" frequencies, for example, 20-150 Hz) is selected. Any desired frequency below that point is rendered by enveloping a signal at resonant frequency with a sine wave at the desired frequency. Any desired frequency above this point is used to directly drive the actuator. However, the transition from one drive mode to the other may be abrupt and the strength of the vibration may be very weak near the transition point. The greater the disparity between the wavelength of the signal at resonance and rise time plus fall time, the less effective the single transition point becomes.

The transition point may be determined algorithmically by measuring acceleration using an accelerometer mounted to the device, such as being mounted on LRA 18. The drive signal for the test is made up of a sine or square wave at the device's resonant frequency multiplied by a sine wave that varies in frequency from low to high (frequency sweep), spanning the critical range. The acceleration will rise and fall with the envelope wave and the peak acceleration during each period decreases as the envelope frequency increases. Additionally, a sine wave frequency sweep (without the resonant component) is played, generating a second acceleration trace that generally increases in strength as the frequency increases until it reaches the resonant frequency of the device. The best transition point for optimizing strength is where the graphs of these two accelerometer traces cross.

In another embodiment, the transition point may be determined manually by a user feeling these two frequency sweeps. It may be desirable to have a lower or higher transition point based on personal preference or other factors.

Figure 8:
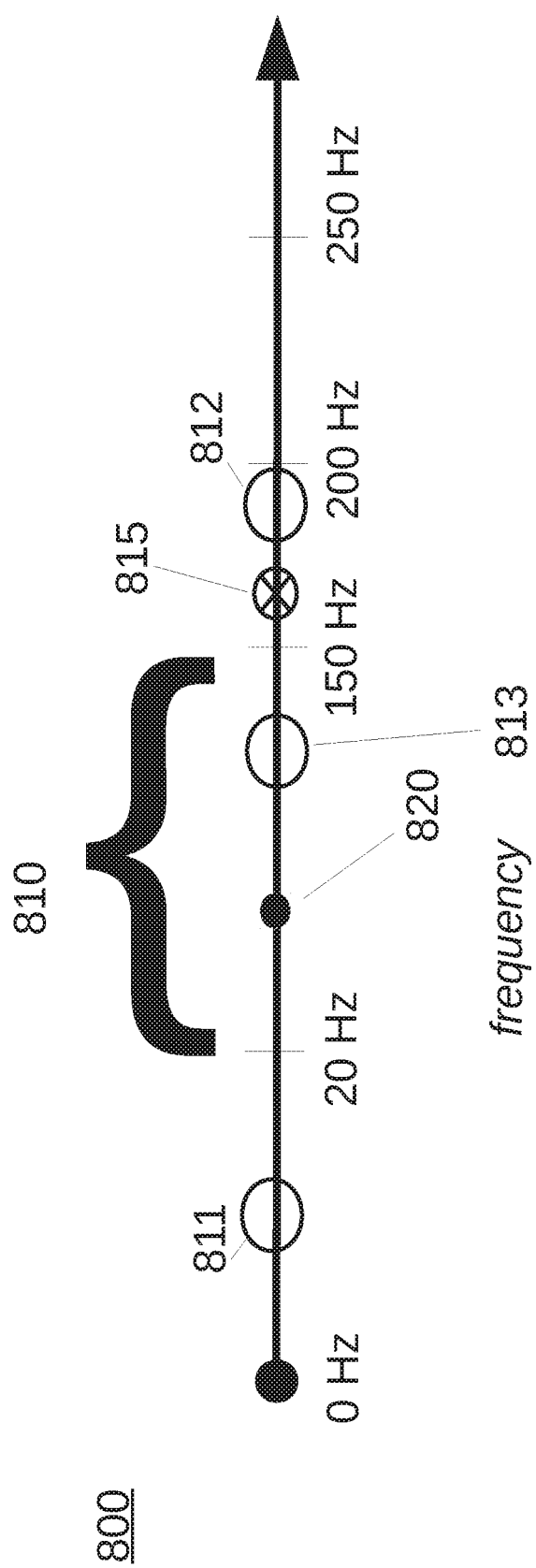
FIG. 8 illustrates aspects of frequency ranges consistent with embodiments herein.

FIG. 8 illustrates aspects of the above-described frequency ranges on the frequency graph 800. Frequency graph 800 shows a range of frequencies from 0 through 200 Hz and beyond. Desired frequencies 811, 812, and 813 represent desired frequencies for haptic effects. Critical range 810 represents an example range for "mid-range" frequency haptic effects (e.g., 20-150 Hz), wherein embodiments transition between modes for generating output haptic effect signals based on the desired frequencies. Resonant frequency 815 is also illustrated on the frequency graph 800. Although shown here as a range between 20-150 Hz, this is an example only for a critical range 810. In some embodiments, a single frequency point 820 within the critical range 810 may be selected for transitioning between two different drive modes based on a desired frequency 811, 812, 813.

Design Choice

In another embodiments, the transition point can be a design-time decision, so that the haptic effect designer (using, e.g., the "Haptic Studio" from Immersion Corp.) may choose which mode to use for the effect. Embodiments may implement this decision by providing an additional parameter to the definition of the effect, expanding existing parameters to include additional discrete values, or repurposing or redefining existing parameters.

Carrier Wave

Figure 3:
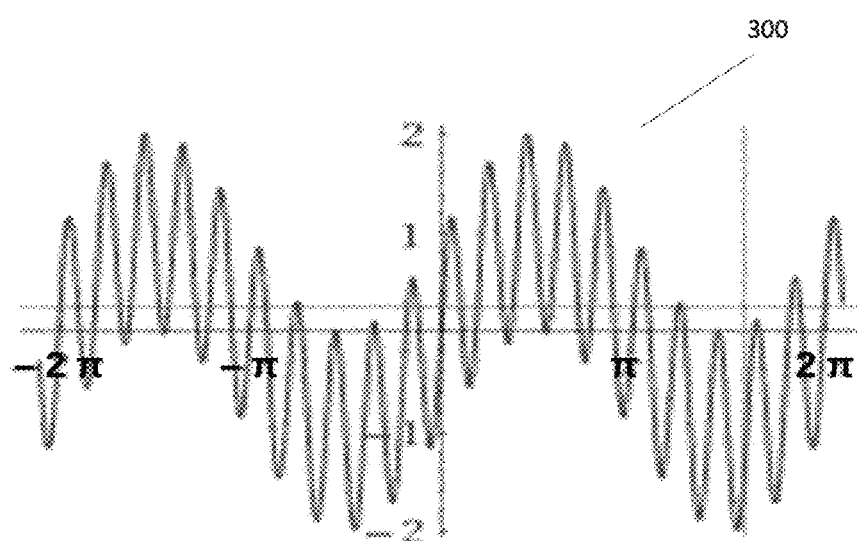
FIG. 3 illustrates a complex waveform using a carrier wave in accordance with one embodiment.

Another embodiment uses the desired frequency of the haptic effect as a carrier wave added to the resonant frequency. In order to increase the useable frequency range while maintaining the strength in the transitional region, two complex waveforms may be used. FIG. 3 illustrates a complex waveform 300 using a carrier wave in accordance with one embodiment. Waveform 300 of FIG. 3 is the sum of two sine waves, although the higher frequency wave can also be a square wave. Waveform 300 is defined as follows:

$$y = V_{desired}[A\sin(2\pi f_{desired}t) + B\sin(2\pi f_{resonant}t)]$$

where A+B=1, $V_{desired}$ is the desired driving voltage of the actuator, and $f_{resonant}$ is an integer multiple of $f_{desired}$ that is as close as possible to the true resonant frequency of the LRA in order to avoid phasing waveforms. One embodiment determines $f_{resonant}$ by multiplying the desired frequency $f_{desired}$ by an integer so that the result is as close as possible to the true resonant frequency. For example, if the actual resonant frequency is 175 Hz and the desired is 55 Hz, a factor of 3 will result in a 165 Hz value for $f_{resonant}$. A factor of 4 would result in a 220 Hz value. 165 Hz is closer to the true resonant frequency, so that is what would be used.

Scaled Product

Figure 4:
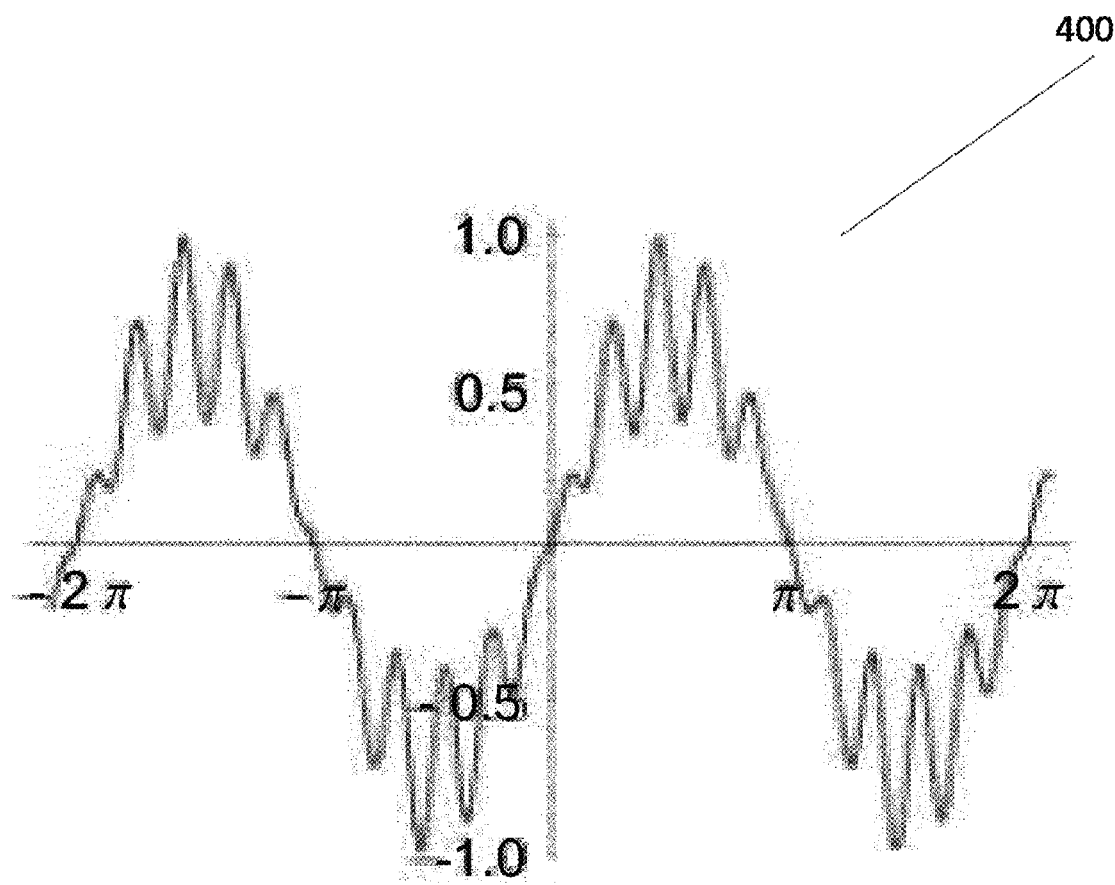
FIG. 4 illustrates a complex waveform using a scaled product in accordance with one embodiment.

In another embodiment, to smoothly transition between sine-enveloped pulsing and direct-drive modes, the enveloped signal can be added to a sine wave at or near resonance to produce a composite of both drive signals as follows:

$$y = V_{desired}[A\sin(2\pi f_{desired}t) + \sin(2\pi f_{resonant}t) + B\sin(2\pi f_{desired}t)]$$

where A+B=1. A and B are scaled inversely over the transitional range such that the enveloped resonant signal is dominant at the low end of the range, and the direct-drive signal is dominant near the high end of the range. $V_{desired}$ is the desired driving voltage of the actuator, and $f_{resonant}$ is a multiple of $f_{desired}$ that is as close as possible to the true resonant frequency of the actuator in order to avoid phasing waveforms. FIG. 4 illustrates a complex waveform 400 using a scaled product in accordance with a embodiment.

Figure 5A:
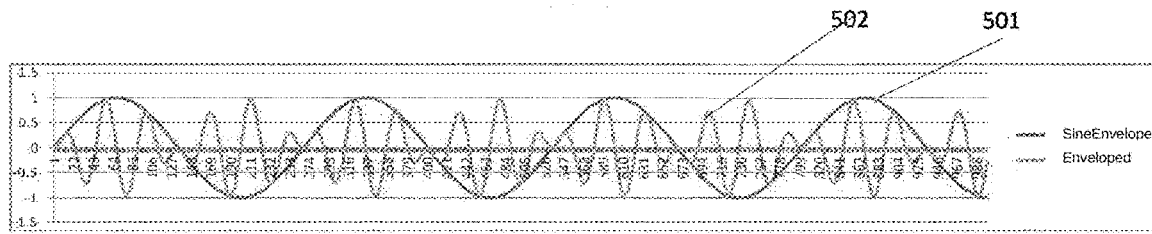
FIGS. 5a-5d illustrate various waveforms of the scaled product in accordance with one embodiment.
Figure 5B:
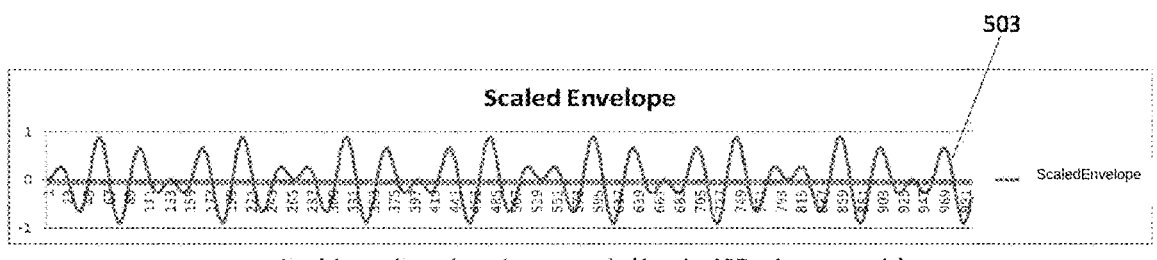
Figure 5C:
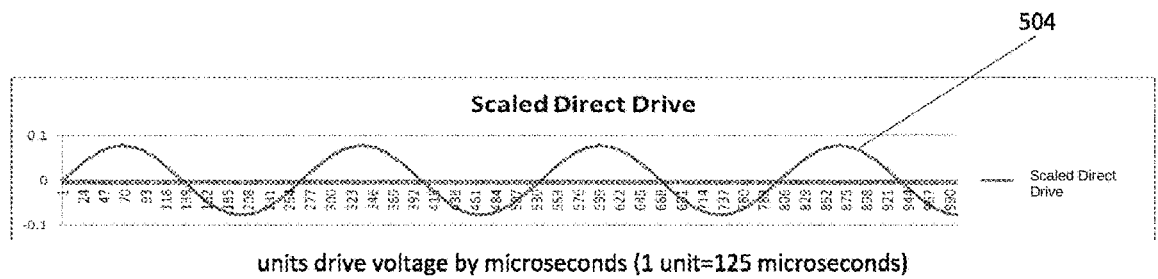
Figure 5D:
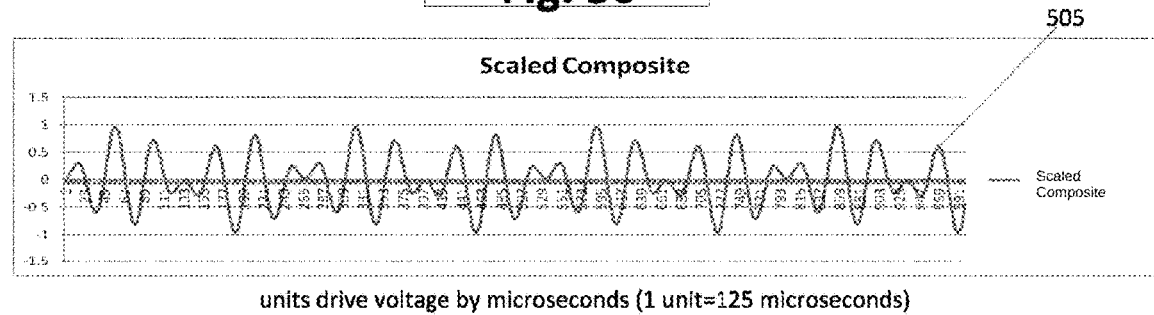

FIGS. 5a-5d illustrate various waveforms of the scaled product in accordance with one embodiment. FIG. 5a illustrates a resonant frequency waveform 501 and a slow enveloped waveform 502 to which it will be multiplied by in accordance with one embodiment. FIG. 5b illustrates a scaled envelope waveform 503 of FIG. 5a in accordance with one embodiment. FIG. 5c illustrates a scaled direct drive waveform 504 in accordance with one embodiment. FIG. 5d illustrates a scaled composite waveform 505 formed from the scaled envelope waveform 503 of FIG. 5b added to the scaled direct drive waveform 504 of FIG. 5c in accordance with one embodiment.

In all embodiments described above, driving an LRA off-resonance will result in a reduction of strength in the haptic effect. Therefore, some embodiments boost the off-resonance drive signals to achieve a flatter response curve (i.e., the graph of acceleration measured by accelerometer vs. drive frequency). Embodiments can boost the signal using one or more of the following, in addition to other known methods:

1. Applying a gain to each sine wave that contributes to the signal independently;
2. Multiplying the computed composite wave by a scale factor based on the frequencies present; and
3. Multiplying the computed composite wave by a predefined scale factor and applying one or more filters (e.g., notch, high-pass, low-pass, etc.) to attenuate the strength at the resonant frequency.

Figure 6:
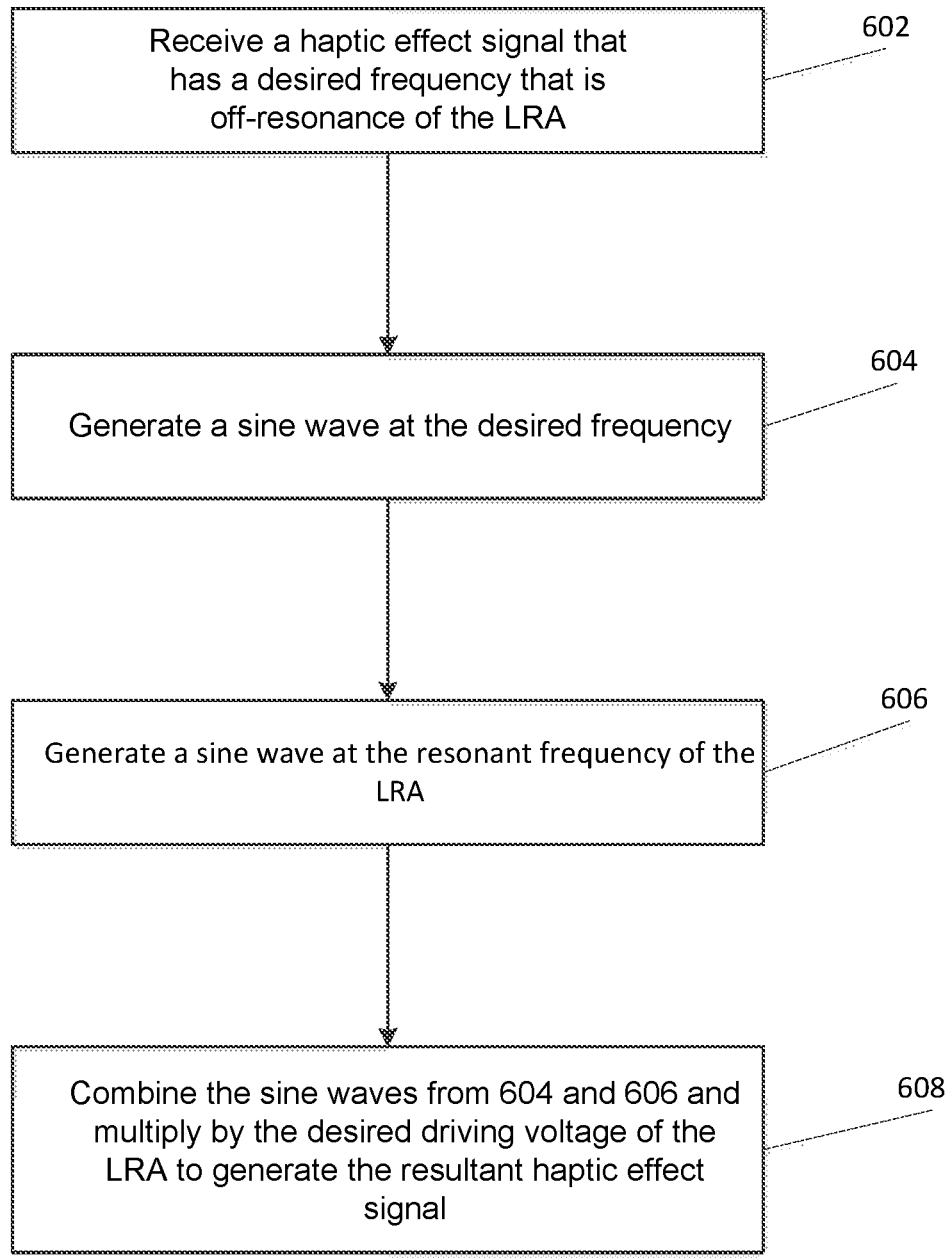
FIG. 6 is a flow diagram of the functionality of the system of FIG. 1 when generating haptic effects using an LRA in accordance with one embodiment.

FIG. 6 is a flow diagram of the functionality of system 10 of FIG. 1 when generating haptic effects using an LRA in accordance with one embodiment. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 602, the haptic effect signal is received. The haptic effect signal has a frequency (i.e., the desired frequency or "$f_{desired}$") that is an off-resonant frequency of the LRA (i.e., not at the LRA's resonant frequency) that will generate the haptic effect.

At 604, a sine wave at the desired frequency is generated.

At 606, a sine wave at or near the resonant frequency of the LRA is generated. In one embodiment, the sine wave frequency is the frequency that is an integer multiple of the off-resonant frequency but is as close to the resonant frequency as possible "($f_{resonant}$)".

At 608, the sine waves from 604 and 606 are combined and multiplied by the maximum rated driving voltage of the LRA to generate the resultant haptic effect signal. In one embodiment, the sine waves are combined as follows:

$$y = V_{desired}[A\sin(2\pi f_{desired}t) + B\sin(2\pi f_{resonant}t)]$$

In another embodiment, the sine waves are combined as follows:

$$y = V_{desired}[A\sin(2\pi f_{desired}t) + \sin(2\pi f_{resonant}t) + B\sin(2\pi f_{desired}t)]$$

The calculations are between 0 and 1, so this resulting scalar would be multiplied by the maximum drive voltage the LRA can handle. In one embodiment, the calculations use integer math in the range of $-127 \ldots 127$ rather than floating point from $0 \ldots 1$.

Figure 7:
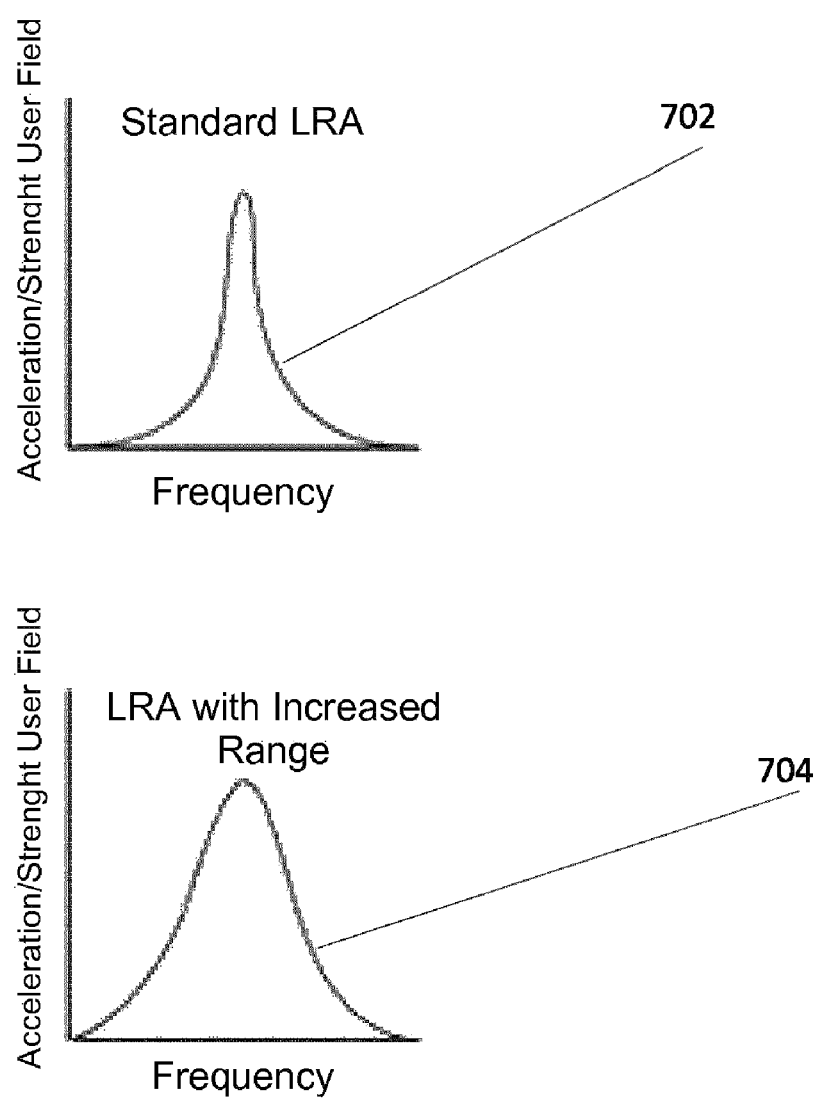
FIG. 7 illustrates an example graph of an LRA generating haptic effects primarily at resonant frequency, and a graph of an LRA generating haptic effects with an increased range/bandwidth in accordance with embodiments of the present invention.

As disclosed, embodiments generate haptic effects that include an off-resonant frequency component. In generating the haptic effect, the bandwidth of the LRA that generates the haptic effect is expanded so that it can render the haptic effects. FIG. 7 illustrates an example graph 702 of an LRA generating haptic effects primarily at resonant frequency, and a graph 704 of an LRA generating haptic effects with an increased range/bandwidth in accordance with embodiments of the present invention.

Several embodiments are specifically illustrated and/or described herein. However, it will be appreciated that modifications and variations of the disclosed embodiments are covered by the above teachings and within the purview of the appended claims without departing from the spirit and intended scope of the invention. For example, although some embodiments use an LRA, any system with an actuator device that experiences a sharp fall-off in performance at off-resonance frequencies when generating haptic effects can use embodiments of the present invention.

What is claimed is:

1. A method of generating a vibratory haptic effect by a linear resonance actuator (LRA) having a resonant frequency, the method comprising:
    receiving an input haptic effect signal comprising a desired frequency;
    comparing the desired frequency to a critical range, the critical range including at least one frequency below the resonant frequency;
    determining an output haptic effect signal based on comparing the desired frequency and the frequency transition range;
    applying the output haptic effect signal to the LRA to generate the vibratory haptic effect.

2. The method of claim 1, wherein comparing the desired frequency to a critical range includes comparing the desired frequency to a single frequency point.

3. The method of claim 2, further comprising determining the single frequency point according to characteristics of the LRA.

4. The method of claim 2, further comprising determining the single frequency point according to an acceleration measurement of the LRA.

5. The method of claim 4, wherein the acceleration measurement of the LRA is determined according to a comparison between accelerometer measurements collected during a first test signal and a second test signal, the first test signal including a resonant frequency signal multiplied by a sine wave frequency sweep and the second test signal including the sine wave frequency sweep.

6. The method of claim 1, wherein the output haptic effect signal is determined as a signal at the desired frequency if the desired frequency is higher than the critical range.

7. The method of claim 1, wherein the output haptic effect signal is determined as a first sine wave at the resonant frequency enveloped with a second sine wave at the desired frequency if the desired frequency is lower than the critical range.

8. The method of claim 1, further comprising determining the output haptic effect signal according to a scaled addition of a first signal and a second signal if the desired frequency is within the critical range,
    wherein the first signal is determined by enveloping a first sine wave with a frequency that is a multiple of the desired frequency as close as possible to the resonant frequency with a second sine wave at the desired frequency, and
    the second signal frequency is the desired frequency.

9. The method of claim 1, further comprising determining the output haptic effect signal according to a scaled addition of a first signal and a second signal if the desired frequency is within the critical range,
    wherein the first signal frequency is the desired frequency, and
    wherein the second signal frequency is a multiple of the desired frequency as close as possible to the resonant frequency.

10. A haptic effect system comprising:
    a linear resonance actuator (LRA) having a resonant frequency;
    an actuator drive circuit coupled to the LRA; and
    a controller coupled to the actuator drive circuit, wherein the controller receives an input haptic effect signal comprising a desired frequency;
    wherein the controller is configured to
        compare the desired frequency to a critical range, the critical range including at least one frequency below the resonant frequency,
        determine an output haptic effect signal based on comparing the desired frequency and the critical range, and
    wherein the actuator drive circuit is configured to apply the output haptic effect signal to the LRA, causing the LRA to generate a vibratory haptic effect.

11. The system of claim 10, wherein the critical range is a single frequency point.

12. The system of claim 11, wherein the controller is further configured to determine the single frequency point according to characteristics of the LRA.

13. The system of claim 12, wherein the controller is further configured to determine the single frequency point according to an acceleration measurement of the LRA.

14. The system of claim 13, wherein the controller is further configured to determine the acceleration measurement of the LRA according to a comparison between accelerometer measurements collected during a first test signal and a second test signal, the first test signal including a resonant frequency signal multiplied by a sine wave frequency sweep and the second test signal including the sine wave frequency sweep.

15. The system of claim 10, wherein the controller is further configured to determine wherein the output haptic effect signal as a signal at the desired frequency if the desired frequency is higher than the critical range.

16. The system of claim 10, wherein the controller is further configured to determine output haptic effect signal as a first sine wave the resonant frequency enveloped with a second sine wave at the desired frequency if the desired frequency is lower than the critical range.

17. The system of claim 10, wherein the controller is further configured to determine the output haptic effect signal according to a scaled addition of a first signal and a second signal if the desired frequency is within the critical range, wherein the first signal is determined by enveloping a first sine wave with a frequency that is a multiple of the desired frequency as close as possible to the resonant frequency with a second sine wave at the desired frequency, and the second signal frequency is the desired frequency.

18. The system of claim 10, wherein the controller is further configured to determine the output haptic effect signal according to a scaled addition of a first signal and a second signal if the desired frequency is within the critical range, wherein the first signal frequency is the desired frequency, and wherein the second signal frequency is a multiple of the desired frequency as close as possible to the resonant frequency.

* * * * *